(12) United States Patent
Huberman et al.

(10) Patent No.: US 10,422,854 B1
(45) Date of Patent: Sep. 24, 2019

(54) NEURAL NETWORK TRAINING FOR MOBILE DEVICE RSS FINGERPRINT-BASED INDOOR NAVIGATION

(71) Applicant: MAPSTED CORP., Mississauga (CA)

(72) Inventors: Sean Huberman, Guelph (CA); Joshua Karon, Toronto (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/400,551

(22) Filed: May 1, 2019

(51) Int. Cl.
*G01S 5/14* (2006.01)
*G01S 5/10* (2006.01)
*G06N 5/04* (2006.01)
*G01C 21/20* (2006.01)
*G06N 3/08* (2006.01)
*G01S 11/06* (2006.01)

(52) U.S. Cl.
CPC ............. *G01S 5/14* (2013.01); *G01C 21/206* (2013.01); *G01S 5/10* (2013.01); *G01S 11/06* (2013.01); *G06N 3/084* (2013.01); *G06N 5/046* (2013.01)

(58) Field of Classification Search
CPC ......... H04W 4/043; H04W 64/00; G01S 5/14; G01S 5/16; G01S 19/15
See application file for complete search history.

(56) References Cited

U.S. PATENT DOCUMENTS

| | | | |
|---|---|---|---|
| 5,052,043 A * | 9/1991 | Gaborski | G06N 3/084 382/157 |
| 9,400,955 B2 * | 7/2016 | Garimella | G06N 3/082 |
| 2009/0043504 A1 | 2/2009 | Bandyopadhyay et al. | |
| 2016/0379074 A1 | 12/2016 | Nielsen et al. | |
| 2018/0167140 A1 * | 6/2018 | Brandt-Pearce | H04B 10/116 |

* cited by examiner

*Primary Examiner* — Diane D Mizrahi
(74) *Attorney, Agent, or Firm* — Henry I. Ohab

(57) ABSTRACT

A method and system of neural network training for mobile device indoor navigation and positioning. The method, executed in a processor of a server computing device, comprises determining, in the processor, at a first location relative to a wireless signal source at a second location, a set of received signal strength (RSS) input parameters in accordance with a postulated RSS model, the processor implementing an input layer of a neural network, receiving, from a mobile device positioned at the first location, a set of RSS measured parameters from the wireless signal source at the second location, computing, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location, and recursively adjusting the initial weights matrix by backpropagation to diminish the error matrix until the generated RSS output feature matches the RSS measured parameters.

20 Claims, 6 Drawing Sheets

300

Determine, in the processor, at a first location relative to a wireless signal source at a second location, a set of received signal strength (RSS) input parameters in accordance with a postulated RSS model, the processor implementing an input layer of a neural network
310

Receive, from a mobile device positioned at the first location, a set of RSS measured parameters from the wireless signal source at the second location
320

Compute, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location
330

Recursively adjust the initial weights matrix by backpropogation to diminish the error matrix until the generated RSS output feature matches the RSS measured parameters.
340

FIG. 3

NEURAL NETWORK TRAINING FOR MOBILE DEVICE RSS FINGERPRINT-BASED INDOOR NAVIGATION

TECHNICAL FIELD

The disclosure herein relates to the field of neural network training for mobile device indoor navigation and positioning.

BACKGROUND

Indoor navigation or positioning typically involves calibration of specific coordinate positions or locations with regard to signal parameters detectable by various mobile device sensors during traversal of a sequence of such positions. The signal parameters may typically include one or more of received wireless signal strength (RSS), wireless signal connectivity, inertial, magnetic, barometric and optical measurements. Such calibration typically includes time-consuming and error-prone manual calibration efforts directed at generating and maintaining the fingerprint map, or fingerprint database, of positions within the indoor area. Maintaining an accurate and up-to-date fingerprint map can prove especially challenging in practice, due to the inherently dynamic nature of indoor infrastructure that directly affects the measurements and integrity of RSS parameters. For instance, when indoor infrastructure such as internal walls and elevator substructures are modified or added via remodel, changing the physical layout of the indoor infrastructure.

BRIEF DESCRIPTION OF THE DRAWINGS

FIG. 3 illustrates, in an example embodiment, a method of neural network training system for mobile device indoor navigation and positioning.

DETAILED DESCRIPTION

Figure 1:
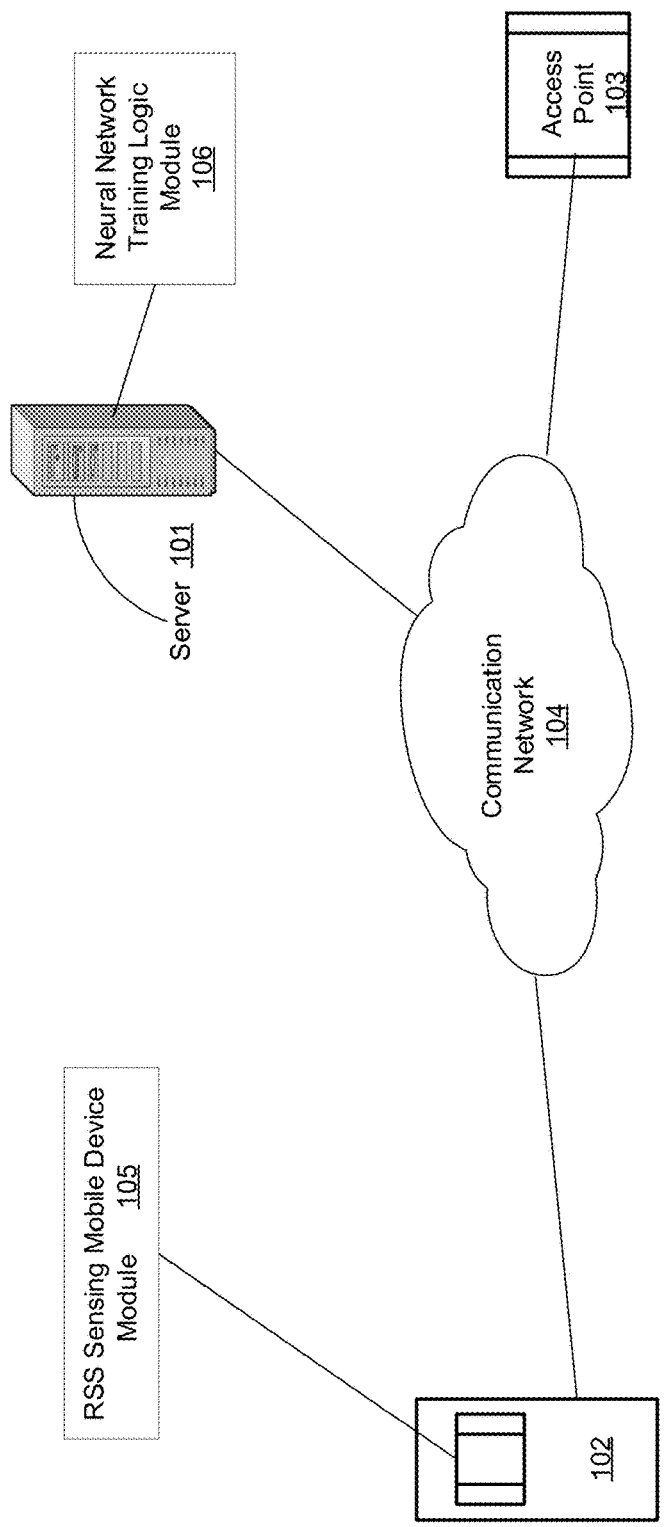
FIG. 1 illustrates, in an example embodiment, a neural network training system for mobile device indoor navigation and positioning.

Among other benefits, the disclosure herein provides for training of a neural network for indoor navigation and positioning of mobile device by integrating a postulated mathematical model of wireless received signal strength (RSS) features with machine learning methods. The neural network trained model can be applied to channel modeling of wireless signals, particularly for indoor environments where traditional signal models are over simplifications of the complexities of an indoor space. The neural network trained model channel model in turn can be used to calibrate indoor position systems with a higher degree of accuracy.

By combining machine learning methods with a postulated mathematical model of RSS features, the resulting neural network trained model provides an advantage of being less data—and processor—resources intensive by way of starting from the initial information of the RSS phenomena being modeled in accordance with the postulated mathematical model. Starting from the postulated mathematical RSS model provides an advantage by compensating for effects due to initial weight values and local minimums without the demanding computational burden of a full training regimen based on starting from randomly generated initial weights values, thus providing faster convergence to a fully trained model.

In particular, the neural network trained model advantageously includes a machine learning component that learns and improves upon the errors of the postulated model. In this manner, the machine learning component of the neural network trained model allows for the introduction for additional features that a postulated mathematical model, taken alone, does not provide.

Provided is a method of a method and system of neural network training for mobile device indoor navigation and positioning. The method, executed in a processor of a server computing device, comprises determining, in the processor, at a first location relative to a wireless signal source at a second location, a set of received signal strength (RSS) input parameters in accordance with a postulated RSS model, the processor implementing an input layer of a neural network, receiving, from a mobile device positioned at the first location, a set of RSS measured parameters from the wireless signal source at the second location, computing, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location, and recursively adjusting the initial weights matrix by backpropagation to diminish the error matrix until the generated RSS output feature matches the RSS measured parameters. The generated RSS output feature matches the RSS measured parameters.

Also provided is a server computing system for neural network training associated with mobile device indoor navigation and positioning. The server computing system comprises a processor and a memory. The memory includes instructions executable in the processor to determine, in the processor, at a first location relative to a wireless signal source at a second location, a set of received signal strength (RSS) input parameters in accordance with a postulated RSS model, the processor implementing an input layer of a neural network; receive, from a mobile device positioned at the first location, a set of RSS measured parameters from the wireless signal source at the second location; compute, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location, and recursively adjusting the initial weights matrix by backpropagation to diminish the error matrix until the generated RSS output feature matches the RSS measured parameters.

The terms localize, or localization, as used herein refer to determining a unique coordinate position of the mobile device at a specific location along a route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building or multi-level building, for example. In other embodiments, the (x, y, z) coordinates may be expressed either in a local reference frame specific to the mobile device, or in accordance with a global coordinate reference frame.

The indoor route, in embodiments, may encompass an indoor area within any one or a combination of a manufacturing facility, a shopping mall, a warehouse, an airport facility, a hospital facility, a university campus facility or any at least partially enclosed building.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). An embedded device as described herein utilizes processors, memory, and logic instructions stored on computer-readable medium. Embodiments described herein may be implemented in the form of computer processor-executable logic instructions or programs stored on computer memory mediums.

SYSTEM DESCRIPTION

FIG. 1 illustrates, in an example embodiment, neural network training system 100 for mobile device indoor navigation and positioning, using RSS sensing mobile device 102. RSS sensing mobile device 102 may include a processor, memory and associated circuitry to accomplish any one or more of telephony, data communication, and data computing. RSS sensing mobile device 102 may be in communication with access point device 103 deployed within the indoor area, The RSS wireless signal source as referred to herein may be a wireless access point device deployed within the indoor area, for example incorporating different wireless signal communication protocols such as Wi-Fi, Bluetooth, and other wireless signal protocols. RSS sensing mobile device 102 may include fingerprint data of a surrounding or proximate pedestrian area, such as a factory manufactory floor or multiple floors, stored in local memory. In other variations, RSS sensing mobile device 102 may be connected within a computer network communication system 104, including the internet or other wide area network, to remote server computing device 101 that stores, in a fingerprint database, the fingerprint data of the pedestrian area, the latter being communicatively accessible to RSS sensing mobile device 102 for download of the fingerprint data.

A pedestrian navigation, or indoor positioning, software application may be downloaded and installed, or stored, in a memory of RSS sensing mobile device 102 and further include a physical layout map of a manufacturing facility or building. In one embodiment, the pedestrian navigation software application may incorporate one or more portions of processor-executable instructions manifesting RSS sensing mobile device module 105. The terms localize or localization as used herein refer to determining an estimated coordinate position (x, y, z) along a pedestrian route or trajectory being traversed in accompaniment of RSS sensing mobile device 102.

RSS sensing mobile device 102 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. RSS sensing mobile device 102 may also include capability for detecting and communicatively accessing ambient wireless communication signals according to various signal protocols including but not limited to any of Bluetooth and Bluetooth Low Energy (BLE), Wi-Fi, RFID, and also satellite-based navigations signals including global positioning system (GPS) signals. RSS sensing mobile device 102 further includes the capability for detecting, via sensor devices, and measuring received signal strengths (RSS) from sources of wireless signals in accordance with various wireless signal protocols. RSS sensing mobile device 102, also referred to herein as mobile device 102, may also sense and determine signal connectivity parameters related to ambient or prevailing wireless signals. In particular, RSS sensing mobile device 102 may include location determination capability by way of a GPS module having a GPS receiver, and a communication interface for communicatively coupling to communication network 104, including by sending and receiving cellular data over data and voice channels.

A fingerprint data repository, or a portion(s) thereof, may be stored in server computing device 101 (also referred to herein as server 101) and made communicatively accessible to RSS sensing mobile device 102 via communication network 104. Server 101 may include neural network training logic module 106 comprised of instructions executable in a processor of server device 101, for use in conjunction with the fingerprint data repository that includes RSS fingerprint data. In some embodiments, it is contemplated that the fingerprint data repository, or any portions of data and processor-executable instructions constituting the fingerprint data repository, may be downloaded for storage, at least temporarily, within a memory of RSS sensing mobile device 102. In embodiments, the fingerprint map data stored in the fingerprint data repository further associates particular positions along pedestrian route of the manufacturing facility or indoor area with a particular combination of time-stamped fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, time-stamped individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility in accordance with a particular time stamp of gathering the set of mobile sensor data by time correlating the mobile device gyroscope data, the mobile device accelerometer data, mobile device magnetometer data and any other applicable mobile device sensor data, for example. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101. Server 101 may store respective fingerprint maps of various buildings and indoor areas. The respective building or indoor facility fingerprint maps, or any portions thereof, may be downloaded into a memory of RSS sensing mobile device 102 for use in conjunction with the pedestrian navigation software application executing thereon.

Any localization or position determination of mobile device 102 that is based, even at least partly, on fingerprint data constituted of radio frequency (RF) signals as broadcast having associated RSS values cannot be determined with absolute certainty. Thus, accuracy associated with estimating the position or location of mobile device 102 as a consequence of localization is not absolute, but rather is subject to inherent statistical or probabilistic nature of variations in the wireless radio frequency signal parameters as transmitted and received. For example, such variations may be due to signal reflection and attenuation due to particular indoor infrastructure such as walls, ceilings, and even due to human occupancy factors. In some embodiments, a degree of accuracy associated with the RSS values during traversal by mobile device 102 along an indoor route may be indicated by a confidence level that is determined for, and assigned in conjunction with, a particular wireless signal as broadcast and received. As a measure of the accuracy of localization of mobile device 102 based at least in part on RSS values as determined, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = \frac{1}{N-1} \sum (x - \mu_x)^2$$

-continued
$$\sigma_y^2 = \frac{1}{N-1} \sum (y - \mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread of confidence can be assigned on a per-group basis. If the per-group probability or confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position based on a data fusion of inputs including, but not limited to, any combination of inertial data, barometric data and wireless signal data, comprises a probabilistic estimate expressed as a confidence level.

A particular fingerprint or signature based on any of received wireless communication signal strength and signal connectivity parameters, magnetic field parameters or barometric pressure parameters, and mobile device inertial sensor data may be detected or recorded by RSS sensing mobile device 102, whereupon the fingerprint or signature as detected may be matched to a reference fingerprint, or a reference pattern including a set of fingerprints, in a stored fingerprint map of a given facility made accessible to RSS sensing mobile device module 105 to identify a unique position of RSS sensing mobile device 102 along a pedestrian route. As used herein, term signal connectivity, as distinguished from a signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of RSS sensing mobile device 102 along a sequence of positions that constitute a pedestrian route within, and even adjoining, the indoor facility.

RSS sensing mobile device module 105, constituted of logic instructions executable in a processor of RSS sensing mobile device 102 in one embodiment, enables wireless communication of localization parameters and functionality with server computing device 101.

Figure 2:
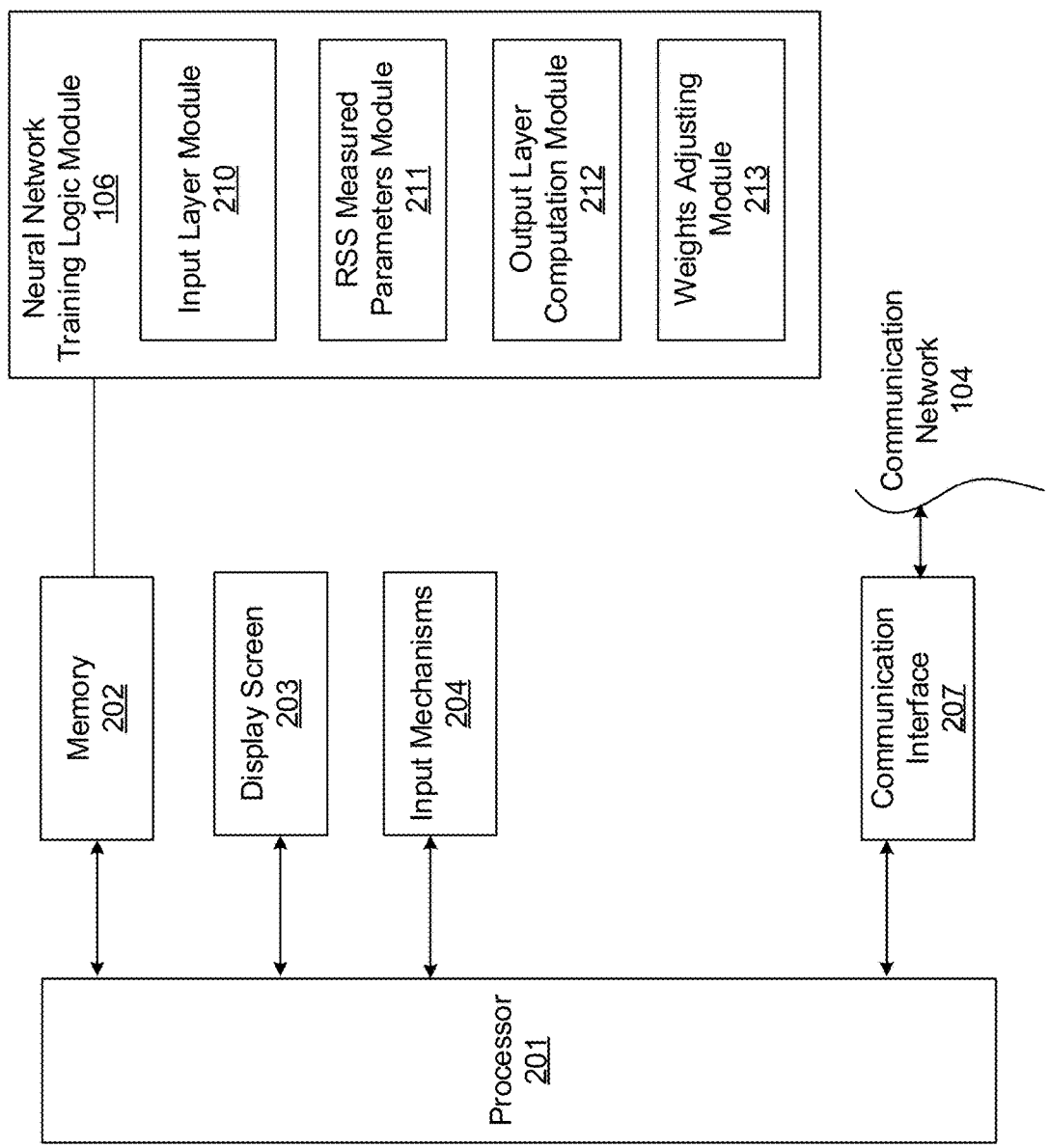
FIG. 2 illustrates, in one example embodiment, an architecture of a server computer implementing a neural network training system for mobile device indoor navigation and positioning.

FIG. 2 illustrates, in one example embodiment, an architecture of a server computer 101 implementing a neural network training system for mobile device indoor navigation and positioning. Server 101, in embodiment architecture 200, may be implemented on one or more server devices, and includes processor 201, memory 202 which may include a read-only memory (ROM) as well as a random access memory (RAM) or other dynamic storage device, display device 203, input mechanisms 204 and communication interface 207 communicatively coupled to communication network 104. Processor 201 is configured with software and/or other logic to perform one or more processes, steps and other functions described with implementations, such as described by FIGS. 1-6 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of the both wired and wireless network links. Using the network link, server 101 can communicate with RSS sensing mobile device 102.

RSS sensing mobile device module 105 of RSS sensing mobile device 102 includes instructions stored in memory 202 of RSS sensing mobile device 102, the instructions being executable in a processor of RSS sensing mobile device 102. In alternate embodiments, it is contemplated that any one or more or portions of RSS sensing mobile device module 105 may be located at remote server device 101 communicatively accessible to mobile devices 102a-n via network communication interface 207.

Neural network training logic module 106 of server 101 may include executable instructions comprising sub-modules input layer module 210, RSS measured parameters module 211, output layer computation module 212 and weights adjusting module 213.

Processor 201 uses executable instructions of input layer module 210 to determine, in the processor, based on a first location relative to a wireless received signal strength (RSS) source having a second location, a set of received signal strength (RSS) input parameters in accordance with a postulated RSS model, the processor implementing an input layer of a neural network.

Processor 201, in conjunction with RSS sensing mobile device module 105 in an embodiment, uses executable instructions stored in RSS measured parameters module 211 to receive, from a mobile device positioned at the first location, a set of RSS measured parameters from the wireless signal source at the second location.

Processor 201 uses executable instructions stored in output layer computation module 212 to compute, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location.

Processor 201 uses executable instructions stored in weights adjusting module 213 to recursively adjust the initial weights matrix by backpropogation to diminish the error matrix until the generated RSS output feature matches the RSS measured parameters. The initial weights matrix may be determined as a starting matrix of weights for a convolution layer of the neural network model based at least in part on the postulated mathematical model used to determine the RSS input parameters.

METHODOLOGY

FIG. 3 illustrates, in an example embodiment, method 300 of neural network training for mobile device indoor navigation and positioning. In describing examples of FIG. 3, reference is made to the examples of FIGS. 1-6 for purposes of illustrating suitable components or elements for performing a step or sub-step being described.

Examples of method steps described herein relate to the use of RSS sensing mobile device 102 for implementing the techniques described. According to one embodiment, the techniques are performed by RSS sensing mobile device module 105 of RSS sensing mobile device 102 in response to execution of one or more sequences of software logic instructions that constitute RSS sensing mobile device module 105. In embodiments, neural network training logic module 106 may include the one or more sequences of instructions within any one or more, or parts, of sub-modules including input layer module 210, and RSS measured parameters module 211, output layer computation module 212 and weights adjusting module 213. Such instructions may be read into memory 202 of server 101 from machine-readable medium, such as memory storage devices, or downloaded into memory 202 via network communication interface 207. In executing the sequences of instructions of input layer module 210, RSS measured parameters module 211, output layer computation module 212 and weights adjusting module 213 in memory 202, processor 201 performs the process steps described herein. In alternative implementations, at least some hard-wired circuitry may be used in place of, or in combination with, the software logic instructions to implement examples described herein.

Thus, the examples described herein are not limited to any particular combination of hardware circuitry and software instructions. Additionally, it is contemplated that in alternative embodiments, the techniques herein, or portions thereof, may be distributed between RSS sensing mobile device 102 and remote but communicatively accessible server computing device 101.

At step 310, processor 201 executes instructions included in input layer module 210 to determine, in the processor, at a first location relative to a wireless signal source at a second location, a set of received signal strength (RSS) input parameters in accordance with a postulated RSS model, the processor implementing an input layer of a neural network, the set of RSS input parameters providing an RSS input feature to the input layer of the neural network.

The set of RSS input parameters are determined in the processor of the server computing device in accordance with execution of the postulated RSS model. The RSS wireless signal source as referred to herein may be a wireless access point device deployed within the indoor area, for example incorporating different wireless signal communication protocols such as Wi-Fi, Bluetooth, and other wireless signal protocols.

The postulated mathematical model, also referred to as the postulated model herein, is used to model the RSS indoors, as illustrated in the examples herein, as:

$$Rss = -10n\log_{10}\left(\sqrt{(x-x_0)^2 + (y-y_0)^2}\right) + C$$

Where n is the path loss exponent, C is a constant, and $x_0$ and $y_0$ are the coordinates of the wireless signal access point device. Note there is no parameters corresponding to walls in the above equation and therefore the decrease in RSS due to walls is not included in the model. Fitting this model to a set of RSS signal strength measurements produced the FIG. 4 approximation result of the RSS field.

Figure 4:
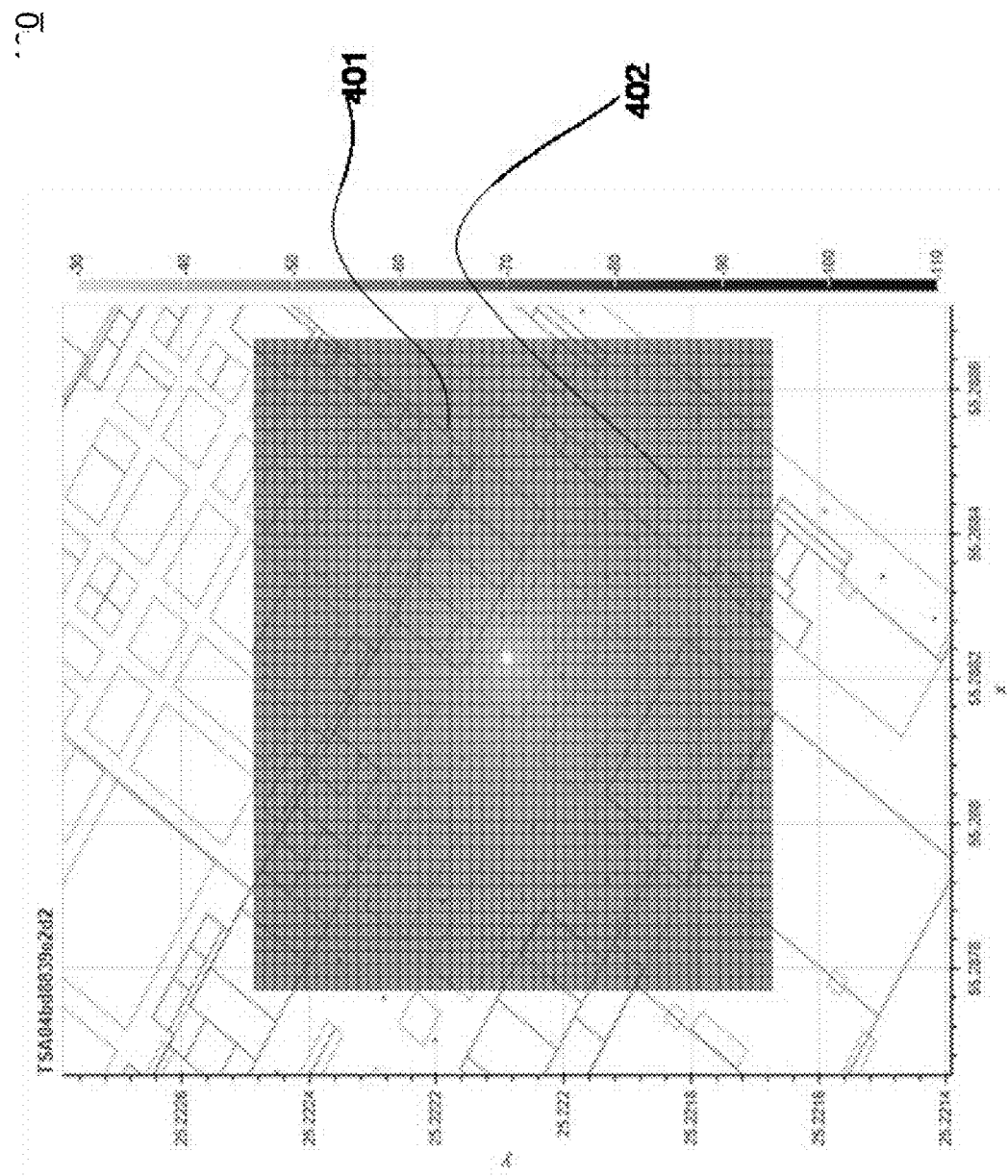
FIG. 4 illustrates results generated in an exemplary received signal strength postulated model.

FIG. 4 illustrates results generated in an exemplary received signal strength postulated model. FIG. 4 in particular illustrates the modeled signal strength for each grid cell of the indoor area 400 considered, layout feature lines 401 indicate walls and other features in the indoor space, and the dots 402 indicate positions where RSS measurements were taken. The postulated model represents an oversimplification as it does not take into effect attenuations, decreases and other variations in the RSS field due to walls, partitions and ceilings. Such barriers for wireless signals can be expected to constitute clear discontinuities in the RSS field on the opposite side of a wall with respect to the access point device. Seeing as these discontinuities are not present it is clear that a postulated mathematical model alone is sufficiently accurate to warrant deployment and implementation.

To improve the model of the RSS field a training model was created based on, or starting from, the postulated model described above. The errors of the mathematical model and the walls were modeled with an artificial neural network, a convolution neural network in this specific case, though it is contemplated that other neural network models such as a recurrent neural network may be applied, at least in part. The inputs for the neural network included the location of the interpolation point and the number of walls intersecting the direct line of sight between the interpolation point and the location of the access point (which was estimated in the postulated model, $x_0$ $y_0$).

In the particular embodiment of a convolution model, the convolution operation typically embodies two parts of inputs: (i) input feature map data, and (ii) a weight (also referred to as output filter, or kernel). Given the input channel data with W(Width)×H(Height)×IC data cube and R×S×IC filter, the output of direct convolution may be formulated as:

$$y_{w,h} = \sum_{r=0}^{R-1} \sum_{s=0}^{S-1} \sum_{c=0}^{C-1} x_{(w+r),(h+s),c} * w_{r,s,c}$$

where:
X=input data/input feature/input feature map
w=width of the input or output data
h=height of the input or output data
R=weight size (width)
S=weight size (height)
C=number of input channel
Y=output data/output feature/output feature map
W=filter/kernel/weight For each input channel, the filter, or weight, are convoluted with data and generates output data. The same location of data of all the input channels are summed together and generate 1 output data channel.

A weight is applied to detect a particular RSS feature of the input map from an input data stream.

Each output channel of the convolution model is represented by an output filter or weight used to detect one particular feature or pattern of the input feature data stream. In convolution networks there may be many output filters or weights for each layer of the convolution model corresponding to respective features or patterns in the data stream of an input RSS feature.

In some embodiments, the neural network is one of a recurrent neural network and a convolution neural network. In a convolution neural network, wherein the first neural network layer may correspond to the set of RSS input parameters for a wireless signal in accordance with a first wireless communication protocol, and further comprising a second neural network layer that corresponds to the set of RSS input parameters for a wireless signal in accordance with a second wireless communication protocol. In other embodiments, yet a third neural network layer of the convolution neural network may be applied, corresponding with a wireless signal connectivity input feature.

At step 320, processor 201 executes instructions included in RSS measured parameters module 211 to receive, from a mobile device positioned at the first location, a set of RSS measured parameters from the wireless signal source at the second location. The term RSS measured parameters as used herein is synonymous with actual RSS parameters as acquired at a mobile device having an RSS sensor device, as opposed to RSS parameters determined based on the mathematical postulated RSS model.

In some embodiments, one or more structural features of the indoor facility, such as a wall or a partition, may be interposed between the set of RSS measured parameters between the signal source location (the first location) and the receiving location (the second location). Such walls or partitions may be constructed at least partially of any one or more of masonry, plastics, wood, glass and fabric.

Figure 5:
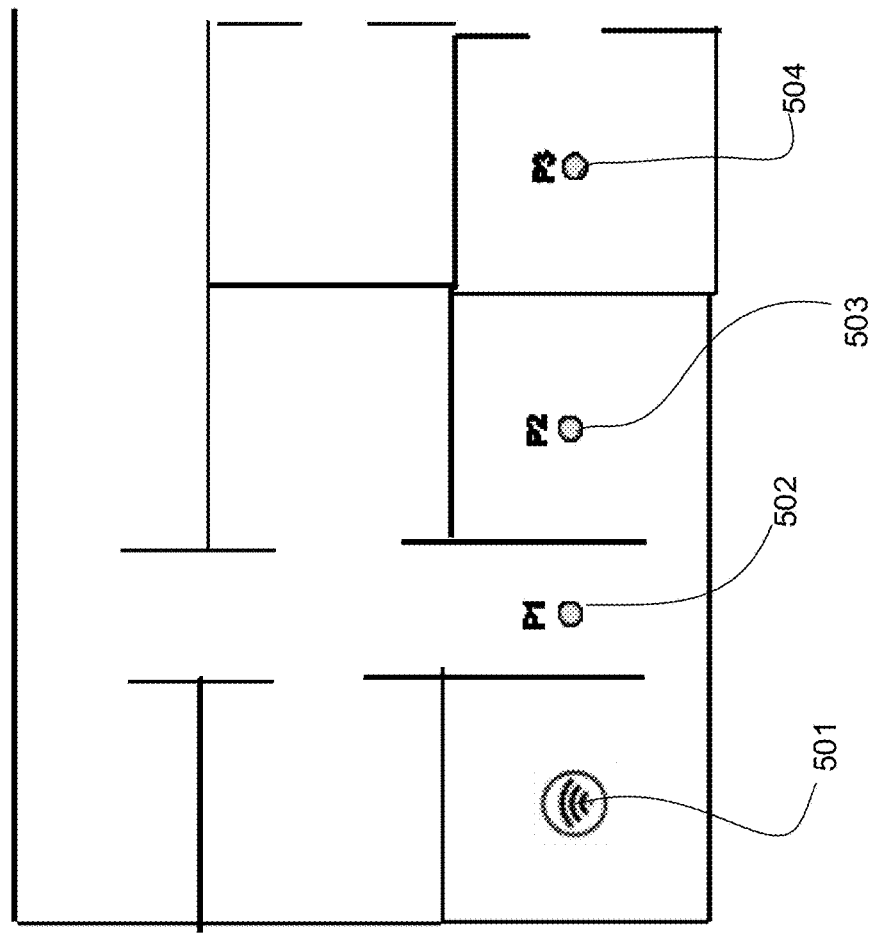
FIG. 5 illustrates, in an example embodiment, placement of source and receiver signal devices for a neural network training system for mobile device indoor navigation and positioning.

FIG. 5 illustrates, in an example embodiment, placement 500 of source 501 and receiver signal devices 402-404 for a neural network training system for mobile device indoor navigation and positioning, the lines of the physical layout representing walls or other partitions in accordance with layout features of the indoor space.

The parameterization of the output error for walls for each interpolation point may be considered as:

Input     Output $$\begin{bmatrix} x_i \\ y_i \\ W \end{bmatrix} \rightarrow [e_{mm}]$$

Where $x_i$ and $y_i$ are the coordinates of the interpolation point, W is the number of walls between the access point and the interpolation point, and $e_{mm}$ is the error of the postulated model.

Input vectors in relation to the floor plan example of FIG. 5 may be applied as follows if the location of the access point device is known or estimated, the number of walls intersecting the direct line of sight can be calculated from the given floor plan by the following steps:
 1. Create a temporary line between the Access point and interpolation point
 2. For each wall on the floor plan check for intersection with the temporary line
 3. Count the number of intersecting walls A spatial index, such as a R-Tree, may be alternatively applied in regard to the above 3-step process.

In the example of FIG. 5, the input vectors for the interpolation points P1, P2 and P3 are:

$$\begin{bmatrix} x_1 \\ y_1 \\ 1 \end{bmatrix} \begin{bmatrix} x_2 \\ y_2 \\ 2 \end{bmatrix} \begin{bmatrix} x_3 \\ y_3 \\ 3 \end{bmatrix}$$

At step 330, processor 201 of server 101 executes instructions included in output layer computation module 212 to compute, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location.

At step 340, processor 201 of server 101 executes instructions included in weights adjusting module 213 to recursively adjust the initial weights matrix by backpropagation to diminish the error matrix until the generated RSS output feature matches the RSS measured parameters. The initial weights matrix may be determined as a starting matrix of weights for a convolution layer of the neural network model based at least in part on the postulated mathematical model used to determine the RSS input parameters.

In one embodiment, the backpropagation comprises a backward propagation of errors in accordance with the error matrix as computed at the output layer, the errors being distributed backwards throughout the weights of the at least one neural network layer.

In another embodiment, recursively adjusting the initial weights matrix until the error matrix is diminished as the generated RSS output feature matches the RSS measured parameters within a threshold percentage value of the RSS measured parameters, for example the threshold percentage value comprises at least 95% of the RSS measured parameters.

Figure 6:
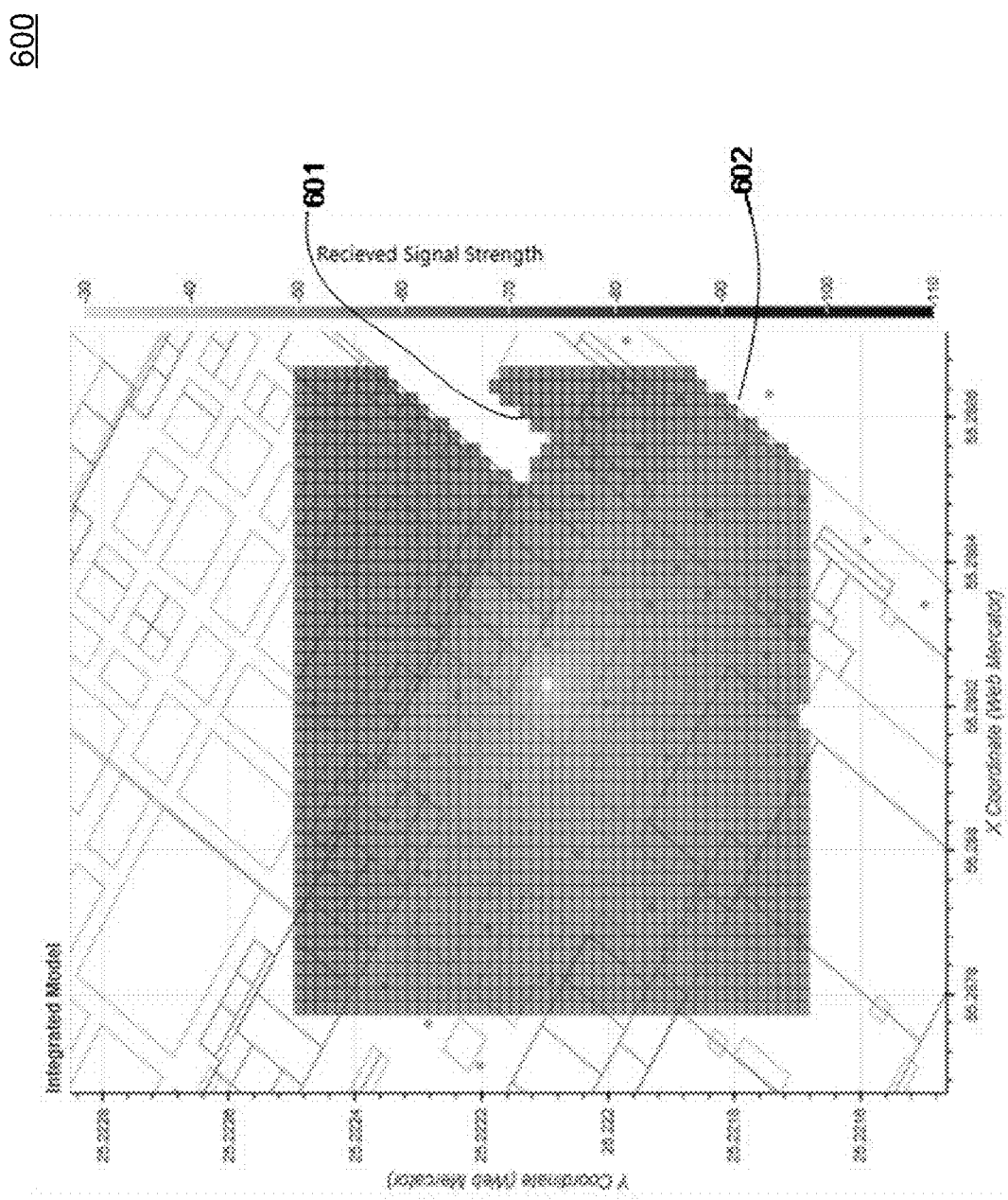
FIG. 6 illustrates results generated in an exemplary received signal strength model in accordance with a neural network trained system for mobile device indoor navigation and positioning.

FIG. 6 illustrates results 600 generated in an exemplary received signal strength model in accordance with a neural network trained system for mobile device indoor navigation and positioning.

The neural network trained model behaves in an intuitive way and is consistent with an understanding of how RSS signal strength deteriorates according to distance from, and obstacles between, a given wireless access point device. Particularly, FIG. 6 illustrates clear discontinuities 601, 602 in the RSS field due to walls or partitions of the physical layout of the indoor space. Comparing this neural network trained model with the postulated model shown in FIG. 5, it is apparent that the trained model is a more detailed representation of the RSS field, and may be applied to create a highly accurate RSS database to improve indoor positioning applications.

It is further apparent that by combining machine learning methods with a postulated mathematical model of RSS features, the resulting neural network trained model provides an advantage of being less data—and processor—resources intensive by way of starting from the initial information of the RSS phenomena being modeled in accordance with the postulated mathematical model. Starting from the postulated mathematical RSS model provides an advantage by compensating for effects due to initial weight values and local minimums without the demanding computational burden of a full training regimen and provides faster convergence to a fully trained model.

Thus, the trained neural network-based model can be applied to channel modeling of wireless signals, particularly for indoor environments where traditional signal models oversimplify the structural complexities of an indoor space. The trained neural network-based model can be used to calibrate indoor positioning systems with a relatively high degree of accuracy.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method, executed in a processor of a server computing device, of neural network training for mobile device indoor navigation and positioning, the method comprising:

determining, in the processor, at a first location relative to a wireless signal source at a second location, a set of received signal strength (RSS) input parameters in accordance with a postulated RSS model, the processor implementing an input layer of a neural network, the set of RSS input parameters providing an RSS input feature to the input layer of the neural network;

receiving, from a mobile device positioned at the first location, a set of RSS measured parameters from the wireless signal source at the second location;

computing, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location; and recursively adjusting the initial weights matrix by backpropagation to diminish the error matrix until the generated RSS output feature matches the RSS measured parameters.

2. The method of claim 1 wherein the set of RSS input parameters and the initial weights matrix are determined in the processor of the server computing device in accordance with execution of the postulated RSS model.

3. The method of claim 1 wherein the set of RSS measured parameters is determined from at a mobile device positioned at the first location within the indoor area, and the wireless signal source is a wireless access point device.

4. The method of claim 1 wherein the set of RSS measured parameters is received having a structural impediment interposed between the first and second locations.

5. The method of claim 4 wherein the structural impediment comprises at least one of a wall and a partition.

6. The method of claim 1 wherein the neural network is one of a recurrent neural network and a convolution neural network.

7. The method of claim 6 wherein the neural network comprises the convolution neural network, wherein the at least a first neural network layer corresponds to the set of RSS input parameters for a wireless signal in accordance with a first wireless communication protocol, and further comprising a second neural network layer that corresponds to the set of RSS input parameters for a wireless signal in accordance with a second wireless communication protocol.

8. The method of claim 1 further comprising recursively adjusting the initial weights matrix as the error matrix is diminished until the generated RSS output feature matches the RSS measured parameters within a threshold percentage value of the RSS measured parameters.

9. The method of claim 8 wherein the threshold percentage value comprises at least 95% of the RSS measured parameters.

10. The method of claim 1 wherein the backpropagation comprises a backward propagation of errors in accordance with the error matrix as computed at the output layer, the errors being distributed backwards throughout the weights of the at least one neural network layer.

11. A server computing system for neural network training associated with mobile device indoor navigation and positioning, the server computing system comprising:
a processor; and
a memory including instructions executable in the processor to:
determine, in the processor, at a first location relative to a wireless signal source at a second location, a set of received signal strength (RSS) input parameters in accordance with a postulated RSS model, the processor implementing an input layer of a neural network, the set of RSS input parameters providing an RSS input feature to the input layer of the neural network;
receive, from a mobile device positioned at the first location, a set of RSS measured parameters from the wireless signal source at the second location;
compute, at an output layer of the neural network implemented by the processor, an error matrix based on comparing an initial matrix of weights associated with the at least a first neural network layer representing the RSS input feature to an RSS output feature in accordance with the RSS measured parameters of the mobile device at the first location; and
recursively adjust the initial weights matrix by backpropagation to diminish the error matrix until the generated RSS output feature matches the RSS measured parameters.

12. The system method of claim 11 wherein the set if RSS input parameters and the initial weights matrix are determined in the processor of the server computing device in accordance with execution of the postulated RSS model.

13. The system method of claim 11 wherein the set of RSS measured parameters is determined from at a mobile device positioned at the first location within the indoor area, and the wireless signal source is a wireless access point device.

14. The system method of claim 11 wherein the set of RSS measured parameters is received having a structural impediment interposed between the first and second locations.

15. The system method of claim 14 wherein the structural impediment comprises at least one of a wall and a partition. [metal, masonry, concrete, glass, fabric, plastic].

16. The system method of claim 11 wherein the neural network is one of a recurrent neural network and a convolution neural network.

17. The system method of claim 16 wherein the neural network comprises the convolution neural network, wherein the at least a first neural network layer corresponds to the set of RSS input parameters for a wireless signal in accordance with a first wireless communication protocol, and further comprising a second neural network layer that corresponds to the set of RSS input parameters for a wireless signal in accordance with a second wireless communication protocol.

18. The system method of claim 11 further comprising recursively adjusting the initial weights matrix until the error matrix is diminished until the generated RSS output feature matches the RSS measured parameters within a threshold percentage value of the RSS measured parameters.

19. The system method of claim 18 wherein the threshold percentage value comprises at least 95% of the RSS measured parameters.

20. The system method of claim 11 wherein the backpropagation comprises a backward propagation of errors in accordance with the error matrix as computed at the output layer, the errors being distributed backwards throughout the weights of the at least one neural network layer.

* * * * *